(12) United States Patent
Babin

(10) Patent No.: US 9,044,908 B2
(45) Date of Patent: Jun. 2, 2015

(54) TIRE BLANK ASSEMBLY DEVICE INCLUDING REMOVABLE MEMBERS

(75) Inventor: Thomas Babin, Clermont-Ferrand (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 57 days.

(21) Appl. No.: 13/512,247

(22) PCT Filed: Nov. 24, 2010

(86) PCT No.: PCT/FR2010/052513
§ 371 (c)(1),
(2), (4) Date: Oct. 12, 2012

(87) PCT Pub. No.: WO2011/064500
PCT Pub. Date: Jun. 3, 2011

(65) Prior Publication Data
US 2013/0168023 A1 Jul. 4, 2013

Related U.S. Application Data

(60) Provisional application No. 61/265,258, filed on Nov. 30, 2009.

(30) Foreign Application Priority Data

Nov. 25, 2009 (FR) ...................................... 09 58360

(51) Int. Cl.
*B29D 30/24* (2006.01)
*B29D 30/26* (2006.01)

(52) U.S. Cl.
CPC ........... *B29D 30/24* (2013.01); *Y10T 29/49826* (2015.01); *B29D 30/242* (2013.01); *B29D 30/246* (2013.01); *B29D 30/26* (2013.01); *B29D 2030/2642* (2013.01)

(58) Field of Classification Search
CPC .... B29D 30/24; B29D 30/242; B29D 30/246; B29D 30/26; B29D 2030/2642
USPC ......... 156/133, 414, 415, 416, 417, 418, 419, 156/420; 425/55; 403/324, 326, 328
See application file for complete search history.

(56) References Cited

U.S. PATENT DOCUMENTS 2,614,057 A * 10/1952 Ericson et al. ................ 156/420
4,292,112 A * 9/1981 Kumagai ...................... 156/415

(Continued)

FOREIGN PATENT DOCUMENTS

EP    1 389 520    2/2004
EP    1 612 033    1/2006

(Continued)

OTHER PUBLICATIONS

English language Abstract for JP 2007-152574 (original document dated Jun. 2007).*

*Primary Examiner* — Martin Rogers
(74) *Attorney, Agent, or Firm* — Cozen O'Connor

(57) ABSTRACT

The device for assembling a green blank form of the crown of a tire comprises: a support having a shape that exhibits symmetry of revolution (4), —members (8) for shaping the green tire, and for each member, means (20, 35) for removable attachment to the support, comprising at least one bolt (20) and able to fix the member to the support as soon as the member (8) is in a reception position on the support. The bolt (20) has a face able to collaborate with at least one face of the member or of the support in order to place the member in the reception position, the faces being arranged so that the face of the member or of the support cannot move the bolt. The members, when they are in the reception position, are juxtaposed to form a reception surface for components that form the crown of the tire.

11 Claims, 3 Drawing Sheets

(56) References Cited

U.S. PATENT DOCUMENTS

| | | | |
|---|---|---|---|
| 4,427,473 A | | 1/1984 | Schichman et al. |
| 4,929,298 A | * | 5/1990 | Van Der Poel et al. ....... 156/414 |
| 5,611,650 A | * | 3/1997 | Perkins et al. ................. 408/87 |
| 5,635,016 A | * | 6/1997 | Byerley ..................... 156/406.2 |
| 6,004,250 A | | 12/1999 | Byerley |
| 6,719,531 B2 | * | 4/2004 | Wu ............................... 416/206 |
| 6,723,195 B1 | | 4/2004 | Felten |
| 2002/0134673 A1 | * | 9/2002 | Weng ........................... 204/213 |
| 2005/0084326 A1 | * | 4/2005 | Costa Claver ................ 403/328 |
| 2008/0017298 A1 | * | 1/2008 | Iyanagi ......................... 156/131 |
| 2010/0101732 A1 | * | 4/2010 | Howley et al. ................ 156/414 |

FOREIGN PATENT DOCUMENTS

| | | | | |
|---|---|---|---|---|
| JP | 2007-152574 | * | 6/2007 | ............ B29D 30/24 |
| WO | WO 83/02297 | | 7/1983 | |
| WO | WO 2004/045839 | | 6/2004 | |
| WO | WO 2009/058296 | | 5/2009 | |

* cited by examiner

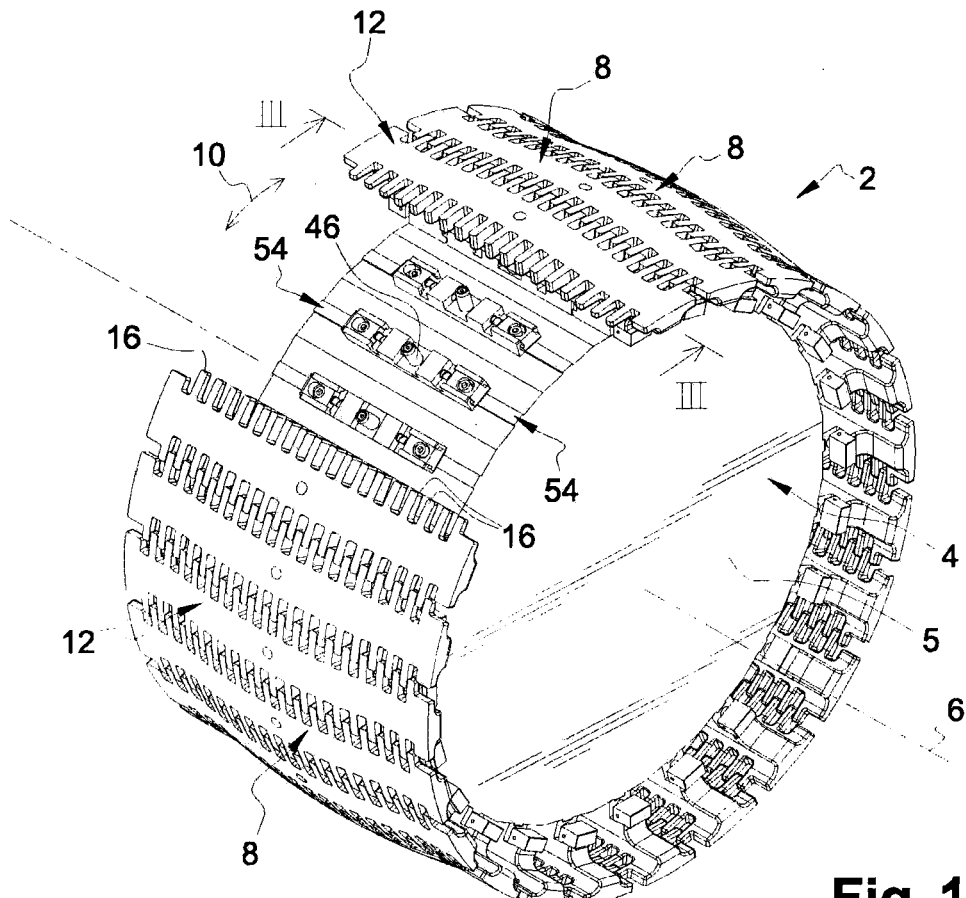
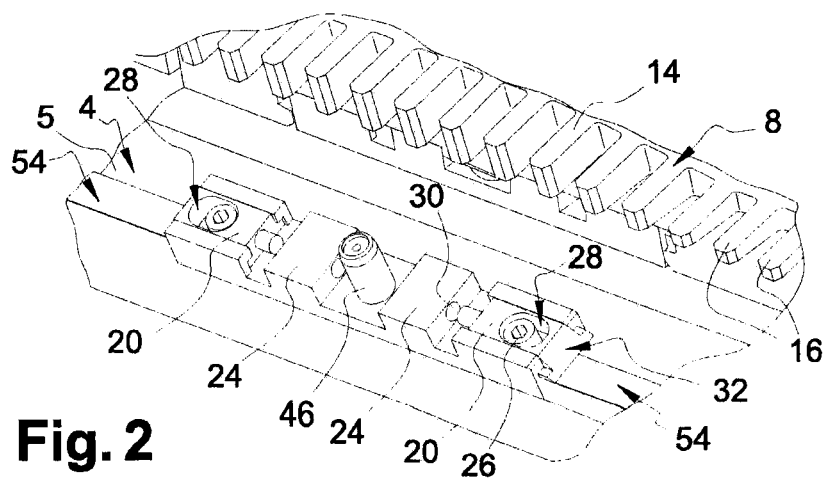

TIRE BLANK ASSEMBLY DEVICE INCLUDING REMOVABLE MEMBERS

RELATED APPLICATION

This is a U.S. National Phase Application under 35 USC 371 of International Application PCT/FR2010/052513 filed on Nov. 24, 2010.

This application claims the priority of French Application No. 09/58360 filed Nov. 25, 2009 and U.S. Provisional Application No. 61/265,258, the entire content of both of which are hereby incorporated by reference.

FIELD OF THE INVENTION

The invention relates to the shaping of green blank forms of vehicle tires.

BACKGROUND OF THE INVENTION

More particularly, such devices for shaping the green form of the crown of the tire and which comprise a plurality of elements that are circumferentially juxtaposed and constitute a reception surface on which the components that form the crown of the tire are assembled, are known. Each of these elements comprises a surface that bears radially on a circumferential portion of the reception surface, intended to receive the radially internal part of the green tire. This surface often has a particular curvature in cross section. In particular, it is known that the shaping elements are fixed to a support of the device by screwing.

Each model of tire requires a shaping device of a specific geometry. Now, the aforementioned device does not allow the elements to be replaced quickly by those of the required shape. It therefore hampers production flexibility. Moreover, for certain ranges of tire, the performance that has to be achieved precludes the ability to adapt the product and therefore makes it necessary to maintain a curved shape.

SUMMARY OF THE INVENTION

It is an object of the invention to be able quickly to adapt the radial profile of a device for assembling the crown region of a green tire according to the model of tire that is to be manufactured.

To this end, one aspect of the invention is directed to a device for assembling a green blank form of the crown of a tire, which comprises:
  a support having a shape that exhibits symmetry of revolution,
  members for shaping the green tire, and
  for each member, means for removable attachment to the support, able to fix the member to the support as soon as the member is in a reception position on the support, the members, when they are in the reception position, being juxtaposed to form a reception surface for components that form the crown of the tire.

Thus, all that is required is for each shaping member to be installed on the support whereupon it will be immediately held and locked in position. The shaping members of the device can therefore be changed quickly, which means that the shape of the device can be adapted without delay when changing the model of tire that is to be produced. This shorter changeover time can be achieved without any constraint regarding the curvature associated with the model of tire. In general, the invention does not impose any dimensional constraint on the tire. There is no longer any need to carry a wide variety of assembly devices with different radial profiles and different diameters, and this means that overall investment costs are appreciably lower.

For preference, for each member, the means of removable attachment comprise at least one bolt having a face able to collaborate with at least one face of the member or of the support in order to place the member in the reception position.

Advantageously, these faces are arranged so that the face of the member or of the support cannot move the bolt.

Advantageously, the device is arranged in such a way that it allows each member to have a path that is radial, with reference to a main axis of the device, with respect to the support as far as its reception position.

This is the simplest and most immediate path for installing each member on the support. The change in shape of the device is therefore particularly simple to achieve.

The assembly device according to embodiments of the invention may further exhibit at least any one of the following features:
  the device comprises, for each member, at least one bolt that fixes the member in the reception position;
  it comprises two bolts for each member;
  the or each bolt is mounted such that it can slide;
  the direction of sliding runs in a plane that is radial to a main axis of the device;
  the direction of sliding is parallel to a main axis of the device;
  the or each bolt forms part of the support;
  it is arranged so that the or each bolt runs in a path of the member as far as the reception position and in such a way that the member, when it follows its path, moves the bolt off this path;
  it comprises return means for returning the or each bolt to a position in which it fixes the member in the reception position;
  it is arranged in such a way that the bolt tends to place the member in the reception position when the member is occupying at least one predetermined position other than the reception position. Thus, the bolt encourages the shaping member to reach the reception position and therefore become attached;
  it is arranged so that, when the member is occupying the reception position, no stress from the member can move the bolt. Thus, ease of installation of each shaping member goes hand in hand with good positional retention thereof; and
  the bolt has a face able to collaborate with at least one face of the member in order to place the member in the reception position, the faces being arranged so that the face of the member cannot move the bolt.

For preference, the device comprises for each member at least one element able to position the member with respect to the support before the member reaches the reception position.

Thus, this or these positioning elements also facilitate installation of the shaping members in the expected position in order to comply with the dimensional characteristics of the tire.

Advantageously, the or one of the positioning elements comprises a centring relief with symmetry of revolution about an axis that is radial to the support.

Advantageously, the or one of the positioning elements is able to position the member with respect to the support in a circumferential direction of the support.

For preference, the device comprises an unlocking control member for releasing the member from the support.

In one embodiment, each shaping member constitutes a rigid subassembly.

In other words, it comprises no parts able to move relative to one another. It is the support which incorporates the moving parts, if need be. This then allows the removable members to be a relatively simple construction.

Another aspect of the invention is directed to a method of building a shaping device for a green blank form of a tire, in which:

members for shaping the green tire are installed in a reception position on a support; and automated means of removable attachment incorporated into the members and/or into the support, fix each member to the support as soon as it has been placed in the reception position.

For preference, the automated means comprise for each member, at least one bolt having a face able to collaborate with at least one face of the member or of the support in order to place the member in the reception position, the faces being arranged so that the face of the member or of the support cannot move the bolt.

BRIEF DESCRIPTION OF THE DRAWINGS

Other features and advantages of the invention will become further apparent in the following description of one embodiment, given by way of nonlimiting example with reference to the attached figures in which:

FIG. 1 is a perspective view of a main part of a shaping device according to the invention in which three of the shaping members have been omitted;

FIG. 2 is a view on a larger scale of a detail of the device of FIG. 1;

FIG. 1 illustrates the main part of a device 2 for shaping a green blank form of a tire.

DETAILED DESCRIPTION OF THE DRAWINGS

It will be recalled that a green tire is generally made up of a carcass on which is positioned a crown assembly intended to form a tread of the tire. The carcass and the crown assembly comprise rubber profiled elements made, for example, of unvulcanized rubber, and, in some cases, of reinforcing threads. The blank form of the crown assembly comprises reinforcing plies formed of reinforcing threads coated with rubber, which are parallel to one another and make a given angle with the circumferential direction of the tire. This blank also comprises the tread and a certain number of rubber profiled elements intended to reinforce the axial ends of the reinforcing plies.

When the green tire is vulcanized in a mould, it is found that the relative position of the carcass and of the crown assembly varies. Their final relative position is dictated by the mould and is therefore known. Because the variation in relative position is itself also known, the geometric characteristics of the tire can be controlled by determining the initial relative position of the carcass and of the crown assembly.

Figure 3:
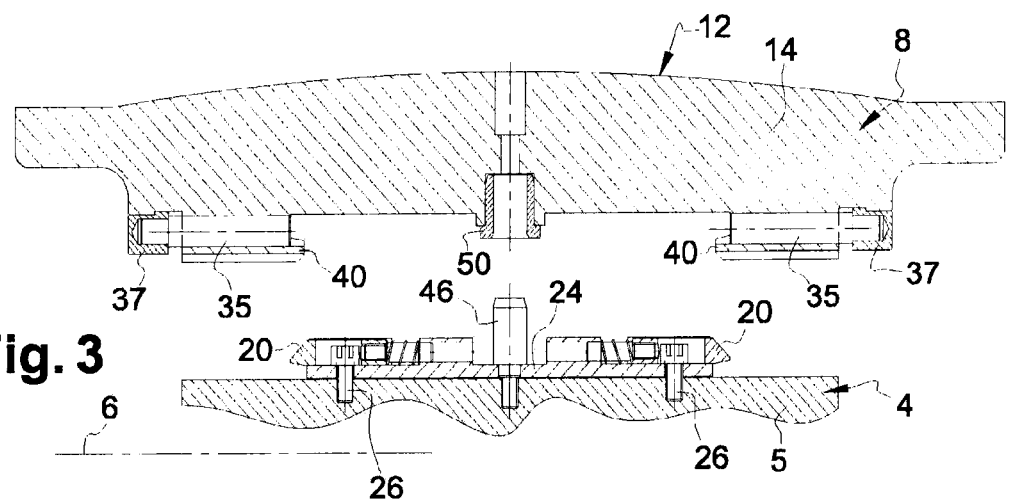
FIG. 3 is a view in radial section on of the device of FIG. 1, showing one member distant from the support.

The green form of the crown assembly is produced and formed on an assembly and shaping device like the device 2. The latter comprises a central support 4 of cylindrical overall shape exhibiting symmetry of revolution about an axis 6, giving it the overall appearance of a drum. The assembly device comprises a series of shaping members 8 which serve to shape the circumferential portion of the green form of the crown of the tire. The members 8, or segments, are fixed rigidly to the support 4 by means of removable attachment, as will be seen later on. The segments 8 each have an overall shape which is flat rectangular in plan view and elongate in the axial direction 6. The segments are placed side by side and follow on from one another in the circumferential direction 10 of the support 4 with reference to the axis 6. Although three of the segments 8 have been omitted from FIG. 1 to make the drawing clearer, in use, the circumference is completely made up of these segments and constitutes the reception surface for the components that form the crown of the tire. Each of the segments 8 has an external shaping face 12 acting as a support, in a direction that is radial to the axis 6, for a circumferential portion of the internal surface of the green tire. As may be seen notably in FIG. 3, the face 12 here has a curvature in a plane radial to the axis 6, giving it a convex shape. It also has a curvature in a plane perpendicular to this axis. The geometry of this face defines the initial geometry of the green tire before it is vulcanized and therefore also defines the corresponding geometric characteristics of the tire after this operation.

Each face 12 is defined by a main body 14 of the corresponding segment. This body, on its lateral longitudinal sides parallel to the axis 6, has cutouts in the shape of teeth or crenellations, giving these sides a comb-like appearance. The teeth 16 between them define spaces which accommodate the teeth of the contiguous segment over part of their length. The contiguous segments are therefore circumferentially imbricated in one another like combs the teeth of which slot inbetween one another. The face 12 extends as far as the ends of the teeth 16. Each of the segments 8 is symmetric overall with respect to a plane of symmetry 17 perpendicular to the axis 6.

Associated with each of the segments 8 are fixing and locking means borne both by the segment 8 and by the support 4. These means are symmetric on each side of the plane 17 which means that only the means that can be seen to the left in FIG. 3 will be described in what follows.

For each segment 8, the support 4 comprises, on one side of the plane 17, a bolt 20 which in this instance forms a slider mounted such that it is able to move in sliding with respect to the main structure 5 of the support 4 in a direction 22 parallel to the axis 6. For that reason it is mounted in a bolt guide 24 fixed rigidly to the main structure, in this instance by two screws 26 running symmetrically with respect to the plane 17. The bolt 20 is guided in sliding in the bolt guide at a rear section and a central section of the bolt. The bolt guide 24 is formed as a single piece for both the bolts 20 associated with the segment 8. Each screw 26 extends through a slot 28 formed in the radial direction in the bolt 20, and into orifices in the bolt guide and in the main structure 5. Associated with each bolt 20 is a return spring 30 a front end of which is in abutment against a rear shoulder of the bolt and a rear end of which is in abutment against the bolt guide. The spring is wound around a section of the bolt.

The front end of the bolt has two planar faces directed towards the front and inclined with respect to one another. The external face 32 is oriented away from the axis 6, unlike the internal face 34.

The body 14 of the segment 8 has a housing that accommodates a push rod 35 mounted such that it can move in sliding with respect to the body 14 in a direction parallel to the axis 6. The push rod 35 has a rear face 36 that is planar and perpendicular to the axis 6. The segment 8 carries a button 37 fixed to the rear end of the push rod 35 and that can be used to actuate the latter to make it slide rearward. The housing of the push rod, which is formed in a radial continuation of the body 14 projecting out from the latter towards the axis 6, has a heel 40 forming a catch and having two faces 42 on its edges. The faces are arranged in such a way as to bear surface-to-surface against the underside 34 of the bolt. For that reason, the faces 42 are planar and suitably inclined.

For each segment 8, the support 4 carries a centring pin 46 projecting from the circumference of the main structure 5 and from the bolt guide in a radial direction. The pin 46 is fixed to the main structure 5 through an orifice in the bolt guide. It has symmetry of revolution about an axis 48 that is radial to the axis 6 and can be inscribed inside the plane 17, a lateral face of cylindrical overall shape and a chamfered outer end.

The segment 8 carries a sleeve 50 housed in a lower orifice 52 of the body 14 extending at the centre of the segment 8 and passing through the plane 17. The sleeve is formed in such a way as to accommodate the pin 46 from a lower end of the sleeve and has a cylindrical face of dimensions similar to those of the lateral face of the pin 46.

The segment 8 is installed on the support 4 as follows. It is assumed that these two items are in the relative position illustrated in FIG. 3.

The segment 8 is offered up to the support in a straight path radial to the axis 6.

Figure 4:
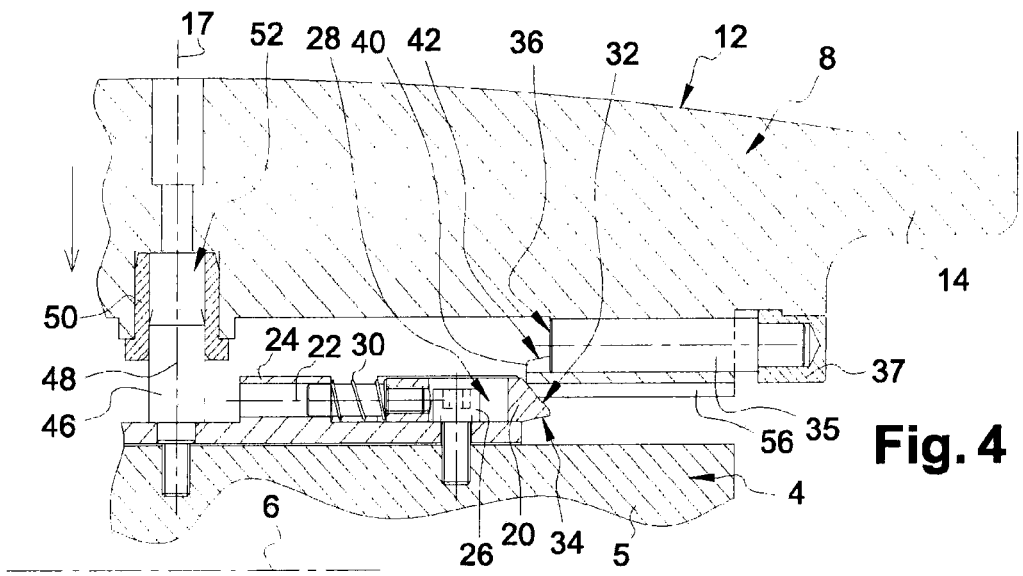
FIGS. 4 to 6 are partial views similar to FIG. 3, showing various steps in the fitting of the member to the support.

With reference to FIG. 4, during this movement, the pin 46 enters the sleeve 50 from the lower end thereof. This then centres the centre of the segment 8 with respect to the support 4 in the circumferential direction 10 and in the axial direction 6. Its orientation about an axis parallel to the axis 6 is also fixed.

The rear end of the heel 40 comes into abutment against the top face 32 of the bolt 20. The latter, urged by the spring 30, is in its rest position, furthest forward, and extends into the path of the segment 8. The inclination of the face 32 and the coefficients of friction resulting from the choice of materials for the bolt and for the body 14 and from their surface finishes are such that, during its radial path, the heel 40 moves the bolt 20, pushing it back towards the pin 46, against the urge of the spring 30.

Figure 5:
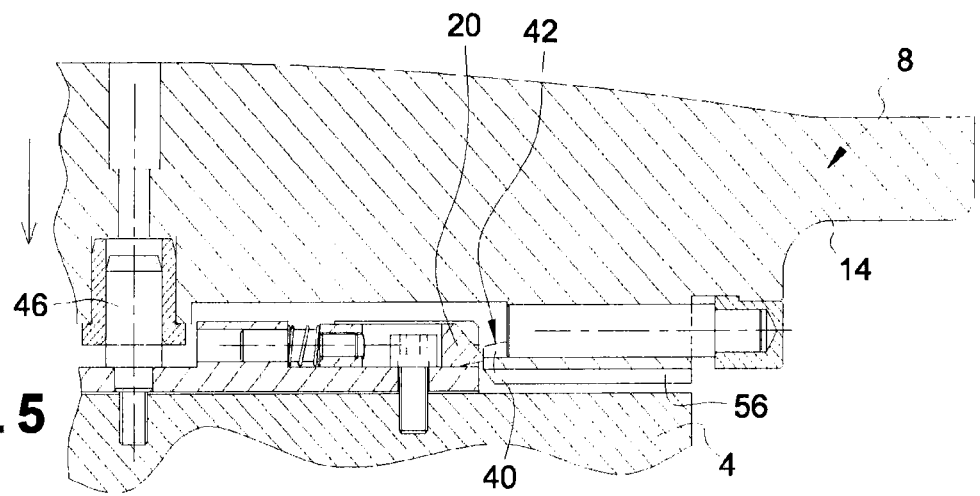

With reference to FIG. 5, this movement is interrupted when the rear end of the heel passes over the front end of the bolt 20.

Figure 6:
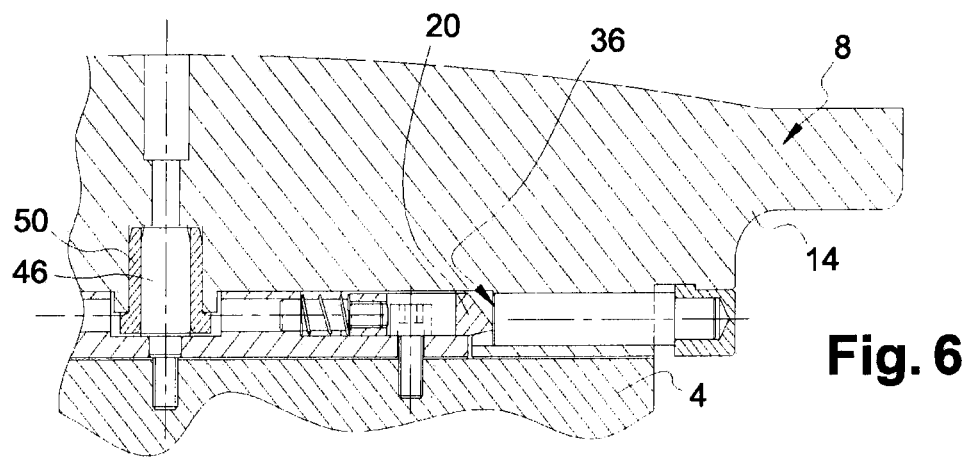

With reference to FIG. 6, after this passage, the segment 8 continues its path and comes into contact with the main structure 5. The latter has a straight groove 54 which at this stage accepts a straight rib 56 borne by the continuation of the segment 8. The rib and the groove are sized such that their nesting one inside the other completes the centring of the segment 8 with respect to the support 4 in the circumferential direction 10, if necessary correcting the angular position of the segment 8 about the axis 48 of the pin. Once the rear end of the heel has passed over the front end of the bolt, the latter is pushed forward by the spring 30. The underside 34 of the bolt therefore comes into contact with the faces 42 on which it slides. This pushes the segment 8 on the support 4 in the radial direction and tends to position it in its reception position illustrated in FIG. 6.

FIG. 6 indeed illustrates the reception position of the segment 8 on the support 4 which is also the position in which it is fixed thereto and the position in which it is used for shaping the green tire. The pin 46 is fully housed in the sleeve 50. The rib 56 is nested in the groove 54.

As may be seen, the means of removable attachment of the member are able to fix the segment 8 to the support 4 to hold it in position as soon as it reaches its reception position.

The bolt 20 is in its position of rest and bearing via its underside 34 against the faces 42 of the heel and forms an obstacle to the moving of the segment 8 away from the support 4 in the radial direction. The inclination of the faces 34 and 42 is indeed chosen, in combination with the coefficient of friction of the surfaces of which it is made, so that no urging of the bolt 20 by the segment 8 can cause the bolt to move back and release the segment 8. Thus there is irreversible collaboration between these faces. In other words, even though the face 34 has been able if necessary to act upon the faces 42 to complete the positioning of the segment 8 in the reception position and cause the bolt 20 to move forward, the faces 42 cannot at all cause the bolt to move back to release the segment 8 and cause it to leave its reception position. Thus, when the segment 8 is subjected to a centrifugal force, it cannot be ejected, and this then makes the locking means particularly reliable.

Naturally, the operation that has just been described occurs simultaneously on the other side of the segment 8 via the other fixing and locking means.

When the segment 8 is to be removed, for example in order to replace it with a segment the face 12 of which has a different shape, the operation is as follows.

It is assumed that the segment is in the position of FIG. 6, namely in the reception position and locked to the support 4.

Figure 7:
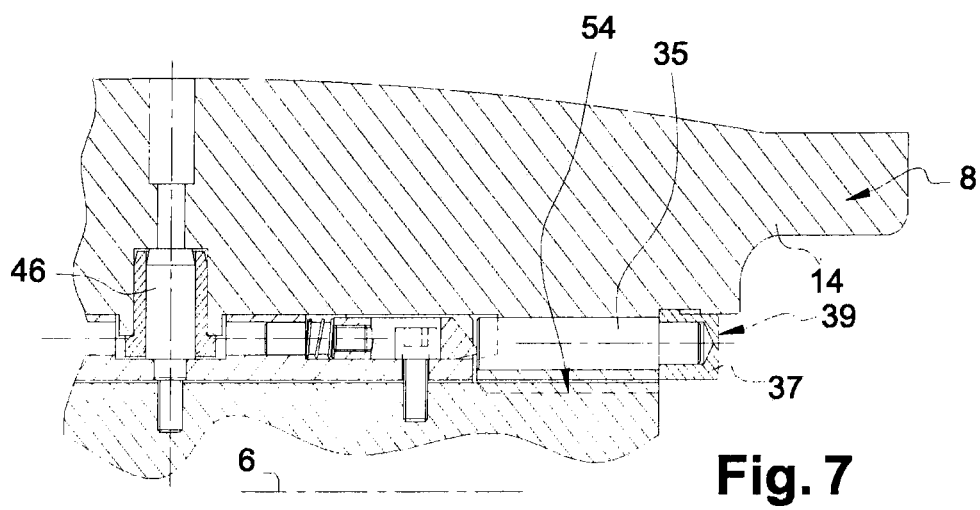
FIGS. 7 and 8 are similar views showing various steps in the separation of the member and of the support.

With reference to FIG. 7, a pressure 39 is applied to the button 37 in the backward direction, which means to say in the direction of the bolt 20 and of the pin 46. This pressure causes the push rod 35 to retreat and it, by pressing via its rear face 36 against the end of the bolt 20, causes the latter to retreat. The locking means are thus unlocked.

Figure 8:
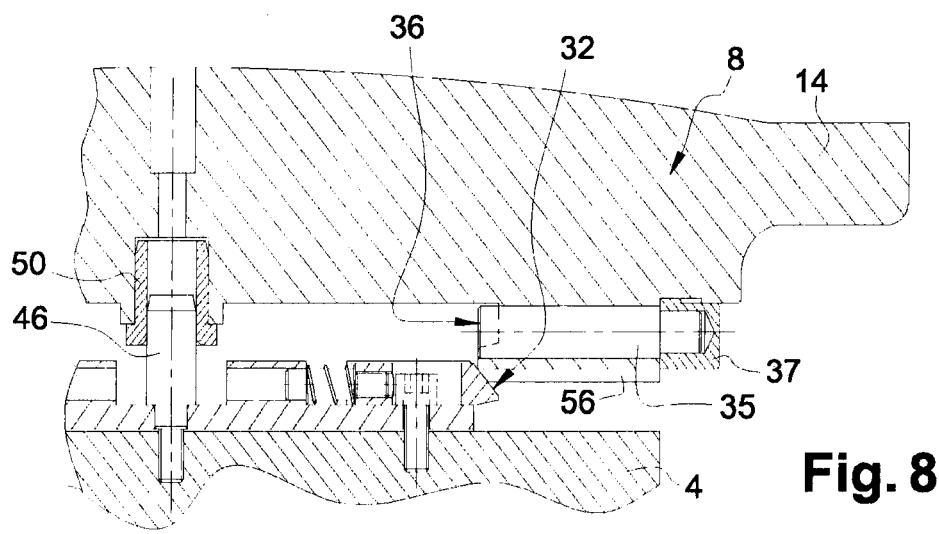

With reference to FIG. 8, while maintaining this pressure, the segment 8 can be moved in the radial direction to move it away from the support 4. During this movement, the front end of the bolt 20 travels over the face 36 of the push rod, then the end of the heel. After the segment 8 has been moved away, the bolt returns to its stretched-out position, under the urge of its return spring, therefore returning to the configuration of FIG. 4.

The fixing means are each unlocked on each side of the plane 17. Pressure on both buttons 37 in opposite directions is a natural movement that is easy to perform.

For preference, when the ribs 56 bear against the bottom of the grooves 54, the face 34 of the bolt has not in a forwards direction travelled over the entirety of the faces 42 of the heel 40. The bolt therefore still has a margin of forward travel left. Should the components become worn at the rib or grooves, the bolt would therefore be able to take up the radial play by bearing against the faces 42.

The invention can be implemented for the green tires for the wheels of vehicles of the light, heavy goods or construction plant type.

Of course, numerous modifications could be made to the invention without departing from the scope thereof.

Provision could be made for each segment 8 to be associated with one single bolt. Provision could be made for the bolt or bolts associated with a segment 8 to be borne by the latter. Provision could be made for the bolt to be able to move in a rotary rather than a sliding manner.

The push rod 35 and the button 37 could be provided with means for returning them forward, for example in the form of a spring.

It is possible for the means of attachment not to comprise a catch and a bolt. They could be clip-fastening or snap-fastening means of attachment which therefore use a temporary elastic deformation of at least one component.

The invention claimed is:
1. A device for assembling a green blank form of the crown of a tire, comprising:
    a support having a shape that exhibits symmetry of revolution about an axis;

members for shaping the green tire blank; and for each member, means for removably fixing the member to the support, said means comprising at least one bolt for fixing the member to the support as soon as the member is in a reception position of the member on the support, for each member the at least one bolt having a face for collaborating with a respective face of the member or of the support for placing the member in its reception position, the at least one bolt slidingly moving parallel to the axis with respect to the support and the member during placement of the member in its reception position such that the at least one bolt moves the member towards its reception position to complete the placement of the member into its reception position by urging the member into its reception position, for each member each respective face being arranged such that each respective face of the member or of the support cannot move the at least one bolt, and the members, when in their reception positions, being juxtaposed to form a reception surface for components that form the crown of the tire.

2. The device according to claim 1, wherein the device is arranged such that each member follows a radial path when being delivered to its reception position, with reference to the axis.

3. The device according to claim 1, wherein the device comprises two bolts for each member.

4. The device according to claim 1, wherein for each member the at least one bolt forms part of the support.

5. The device according to claim 1, wherein the device is arranged such that for each member, the at least one bolt extends in a path of the member as far as its reception position, and such that each member, when following its path, moves the at least one bolt off the path of the member.

6. The device according to claim 1, further comprising:
for each member, return means for returning the at least one bolt to a position in which the member is fixed in its reception position.

7. The device according to claim 1, further comprising:
for each member, at least one element for positioning the member with respect to the support before the member reaches its reception position.

8. The device according to claim 7, wherein each element comprises a centering relief with symmetry of revolution about an axis that is radial to the support.

9. The device according to claim 7, wherein for each member the at least one element is able to position the member with respect to the support in a circumferential direction of the support.

10. The device according to claim 1, further comprising:
for each member, an unlocking control member for releasing the member from the support.

11. The device according to claim 1, wherein each shaping member of the shaping members constitutes a subassembly more rigid than the crown.

\* \* \* \* \*